Nov. 1, 1927.
W. M. COWARD
1,647,561
ROTARY DISTRIBUTING VALVE AND VALVE GEARING FOR STEAM
AND OTHER FLUID PRESSURE ENGINES
Filed June 30, 1923
3 Sheets-Sheet 1
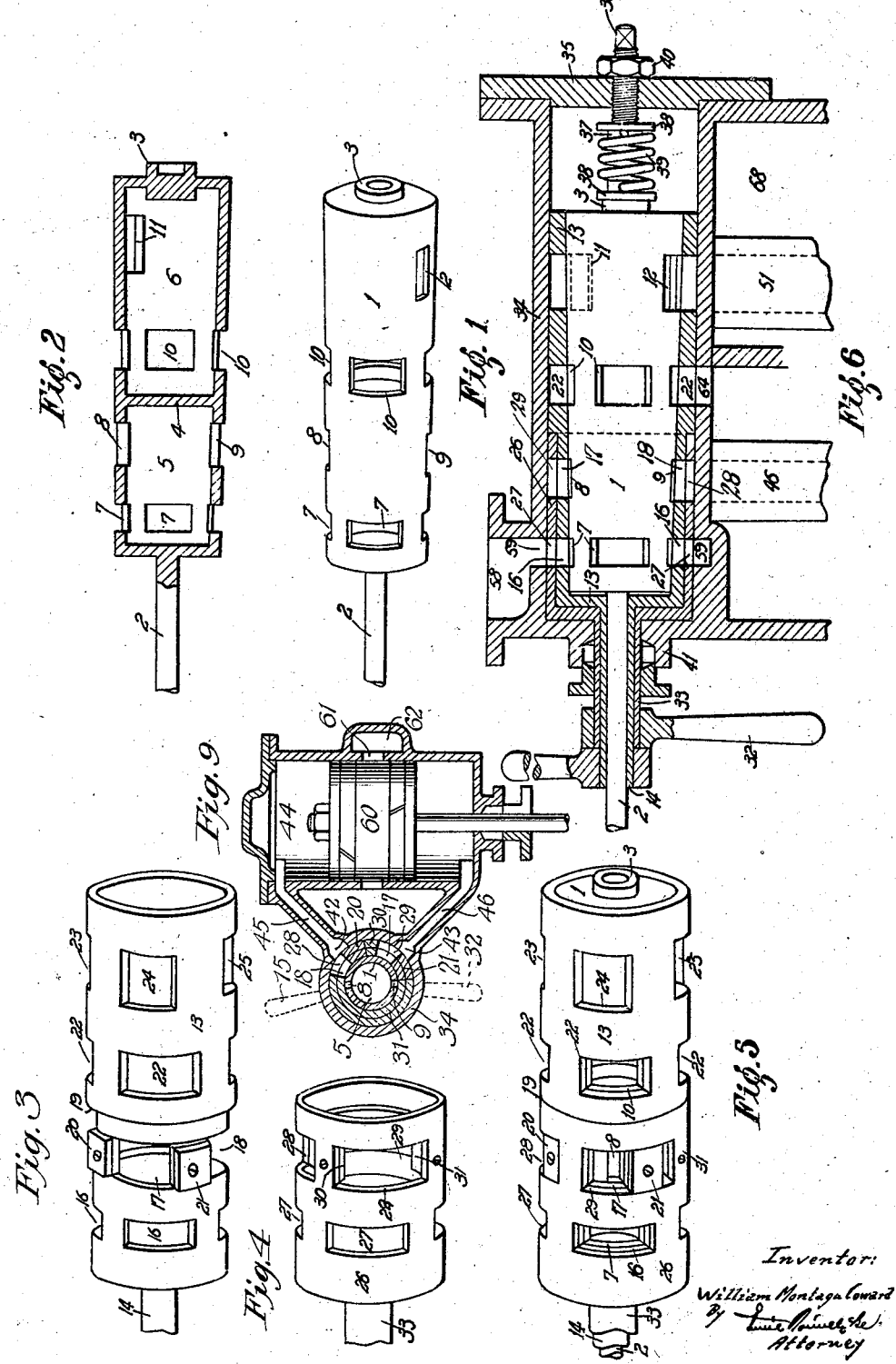

Nov. 1, 1927.

W. M. COWARD 1,647,561

ROTARY DISTRIBUTING VALVE AND VALVE GEARING FOR STEAM
AND OTHER FLUID PRESSURE ENGINES
Filed June 30, 1923     3 Sheets-Sheet 2

Inventor.
William Montagu Coward
By
Attorney.

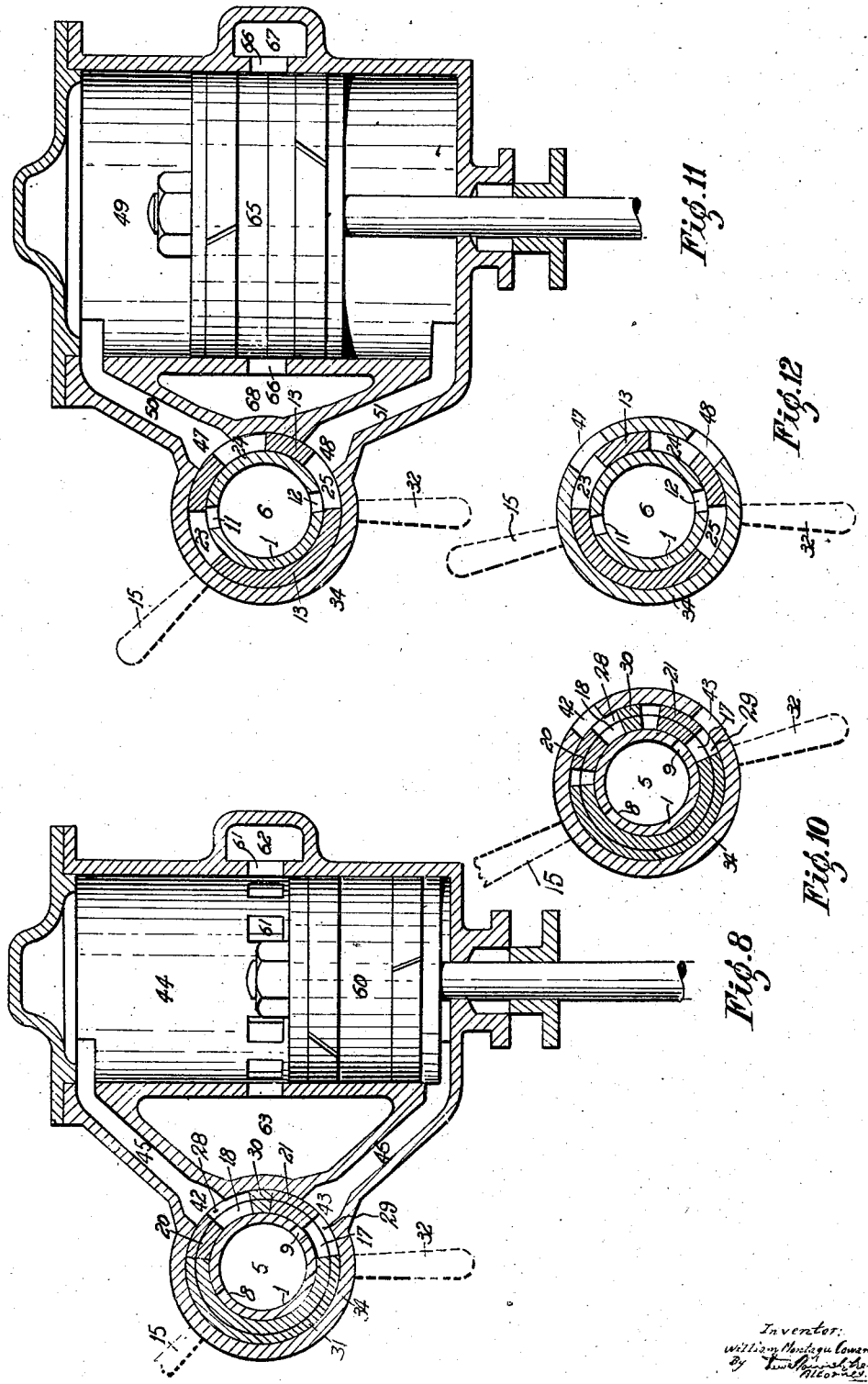

Patented Nov. 1, 1927.

1,647,561

UNITED STATES PATENT OFFICE.

WILLIAM MONTAGU COWARD, OF NEUTRAL BAY, NEAR SYDNEY, NEW SOUTH WALES, AUSTRALIA.

ROTARY DISTRIBUTING VALVE AND VALVE GEARING FOR STEAM AND OTHER FLUID-PRESSURE ENGINES.

Application filed June 30, 1923. Serial No. 648,824.

This invention relates to improvements in rotary distributing valves and valve gearing for steam and other fluid pressure engines, and it has been devised to provide a simple, compact and perfectly balanced valve with small clearances, and adapted to be rotated at any required speed and supply steam or other fluid pressure to one or to a series of cylinders.

A further object of the invention is to provide a valve of the class indicated wherein the cut-off may be conveniently regulated or varied by hand, or automatically by gearing to a governor, independently of the reverse gear: wherein improved means are employed to reverse the engine or vary the load and further to increase the rapidity of the action of the valve so as to permit the ports to be fully opened and closed with small piston movement, thus reducing the throttling and "wire-drawing" of the steam.

A still further object is to provide valve gearing of relatively few parts and consequently of inexpensive construction by eliminating eccentrics and other adjuncts now ordinarily employed for the control and operation of the existing slide, piston and rocking valves.

The invention consists of the features of construction, combination and arrangement hereinafter fully described, reference being had to the accompanying drawings, which illustrate the improved valve construction and its application to a two cylinder engine of the uniflow type.

Figure 1 is a perspective view of the valve.

Figure 2 is a longitudinal section of the same.

Figure 3 is a perspective view of the reversing sleeve.

Figure 4 is a similar view of the cut-off or regulating sleeve.

Figure 5 is a perspective view of the valve, reversing and cut-off sleeves when assembled.

Figure 6 is a longitudinal horizontal sectional view of the assembled valve housed within the valve casing or chest.

Figure 8 is a vertical sectional view on line A—A of Figure 7, showing the valve and its connections to a high pressure cylinder, the engine running normally.

Figure 9 is a sectional view similar to Figure 8, but illustrating the position of the reversing sleeve when the engine is reversed.

Figure 10 is a section through the valve chamber, showing the position of the cut-off sleeve when the engine is running with an early cut-off.

Figure 11 is a vertical sectional view on the line B—B of Figure 7, illustrating the valve and its connections to a low pressure cylinder, the engine running normally.

Figure 12 is a view in section taken through the valve chamber, illustrating the position of the reversing sleeve when the engine is reversed.

Figure 13:
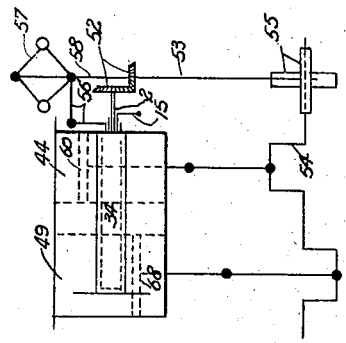
Figures 13 and 14 are diagrammatic side and end views, respectively, illustrative of the general arrangement of the engine with valve drive and governor attachment.
Figure 14:
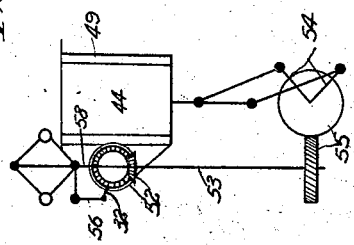

Referring to the drawings, the numeral 1 designates a hollow valve having a tapered configuration and closed at both ends. Fitted centrally to, or cast integrally with the smaller end of the valve is a spindle 2 which is connected to driving gear, to impart rotary motion to said valve.

A bearing base 3 is formed at the larger end of said valve to receive a spring pressure bearing, hereinafter described, for the purpose of correctly seating said valve in the valve casing.

The valve is partitioned by the wall 4 into two chambers 5 and 6, providing steam chests for the high pressure and the low pressure cylinders, respectively. Formed peripherally in said valve adjacent to its end of smaller diameter are inlet ports 7 in open communication with the chamber 5, which has two diametrically opposite outlet ports 8 and 9 formed adjacent to said partitioning wall 4 and spaced intermediate of said inlet ports.

The chamber 6 has a plurality of inlet ports 10 formed in the valve 1 adjacent to its partitioning wall, and two diametrically opposite outlet ports 11 and 12 which are arranged intermediate of said ports 8 and 9 of the other chamber 5.

The valve 1 fits snugly within a reversing sleeve 13—see Figure 3—and is adapted to be rotated therein. This sleeve is open at one end but is closed at its opposite end, to which is affixed a hollow spindle 14 that encircles the valve spindle 2 and provides a long bearing therefor. Fixedly mounted on this hollow spindle is a lever 15, by the operation of which the reversing sleeve 13 can be partially rotated on the valve 1 for the purpose of reversing the direction of rotation of the engine.

Formed in that portion of the reversing sleeve that surrounds the high pressure steam chamber 5 of the valve 1 are inlet ports 16 which are adapted to register with the inlet ports 7, and ports or openings 17 and 18 that are adapted to register with the outlet ports 8 and 9 of said chamber. The reversing sleeve has a shouldered member 19, and it has outwardly projecting blocks 20 and 21 for the purpose hereinafter explained.

That portion of said reversing sleeve which surrounds the lower pressure chamber 6 of the valve is formed with inlet ports 22 adapted to register with the ports 10 of said valve, and it is further provided with three outlet ports 23, 24 and 25 arranged to register with the exhaust ports 11 and 12 of said chamber.

A cut-off sleeve 26—see Figures 4 and 5—fits snugly over and is movable on that portion of the reversing sleeve 13 that surrounds the high pressure chamber 5. This cut-off sleeve is constructed with ports 27 corresponding to the inlet ports 16 of the reversing sleeve and the inlet ports 7 of said high pressure chamber, and it also has ports 28 and 29 corresponding to the openings 17 and 18 of the reversing sleeve and the outlet ports 8 and 9 of said chamber 5 of the valve 1.

The cut-off sleeve is fitted over the reversing sleeve with its inner end in abutment with the shouldered member 19, and with the blocks 20 and 21 of said reversing sleeve disposed in movable and interlocked engagement in the openings 28 and 29 between the segmental bridge blocks 30 and 31 of said cut-off sleeve.

Said cut-off sleeve can be partially rotated on the reversing sleeve by a lever 32 that is fastened to a hollow spindle 33 which fits around and provides a long bearing for the hollow spindle 14—see Figure 6—. Thus the reversing sleeve 13 can be moved around the valve 1 by the operation of the lever 15, and the cut-off sleeve 26 can be moved about said reversing sleeve and adjusted relatively to the ports of the high pressure chamber 5 by the lever 32—the valve spindle 2 and the spindles 14 and 33 of the reversing and cut-off sleeves, respectively, being concentrically arranged.

When the valve, reversing sleeve and the cut-off sleeve are assembled as illustrated in Figure 5, they are seated within a valve casing 34 which is preferably cast integrally with the engine cylinders. This valve casing is furnished at one end with a cover plate 35, which has a central screw-threaded hole to take a screw 36. This screw revolvably supports two bearing buttons 37, the inner of which is engaged by said bearing boss 3. These buttons are constructed with flanges 38, between which is seated a compression spring 39 that maintains the valve 1 in peripheral contact with the reversing sleeve 13, thus ensuring steam-tight conditions, and also compensating for any wear that may occur. The tension of said spring is adjusted by screw 36, which is locked by the nut 40 on said screw. The valve casing is provided at its opposite end with a gland 41, through which are passed the concentrically arranged spindles 2, 14 and 33.

The valve casing 34 has ports 42 and 43 adapted to register with the outlet ports 28 and 29 of the cut-off sleeve 26 and communicating with opposite ends of the high pressure cylinder 44 by means of passages 45 and 46, respectively. Said casing also has ports 47 and 48 corresponding to the outlet ports 23, 24 and 25 of the reversing sleeve 13 and communicating with opposite ends of the low pressure cylinder 49 by passages 50 and 51 respectively.

Oscillation of the reversing sleeve 13 effected by movement of the lever 15 alters the position of the blocks 20 and 21 and consequently the location of the outlet ports 17 and 18 in relation to the ports 43 and 42 formed in the valve casing 34 and in communication with the high pressure cylinder 44—see Figures 8 and 9. This movement of the reversing sleeve also varies the positions of the outlet ports 23, 24 and 25 relatively to the ports 47 and 48 in said valve casing that lead to the low pressure cylinder 49—see Figures 11 and 12—thus changing the flow of steam from one end of the cylinder to the other end.

Oscillatory movement imparted to the cut-off sleeve 26 by the lever 32 (or by connections from a governor as hereinafter described) with consequential movement of the segmental bridge blocks 30 and 31 within the openings or ports 17 and 18 varies the area of these ports that are exposed to the valve, and consequently the period of cut-off of steam to the cylinders.

Rotary motion is imparted to the valve spindle 2 and in consequence to the valve 1 through a pair of meshing bevel wheels 52 from a vertical spindle 53 which receives its motion from the engine crank-shaft 54 through a pair of engaging spiral gears 55.

Automatic control of the cut-off sleeve 26 to govern the speed of the engine is obtained by connecting the lever 32 through a system of levers 56 to a governor 57 mounted upon an upward extension 58 of said spindle 53.

Varying rotary motion transmitted to said governor, when set for an uniform speed, causes the same to oscillate the cut-off sleeve 26 by acting through the levers 56 until a constant engine speed is maintained.

The valve, as illustrated having two opposing outlet ports, is designed to rotate at one half the speed of the crankshaft and the timing is such that the opening of the valve ports to admit steam is in synchronization with the termination of the piston strokes.

Figure 7:
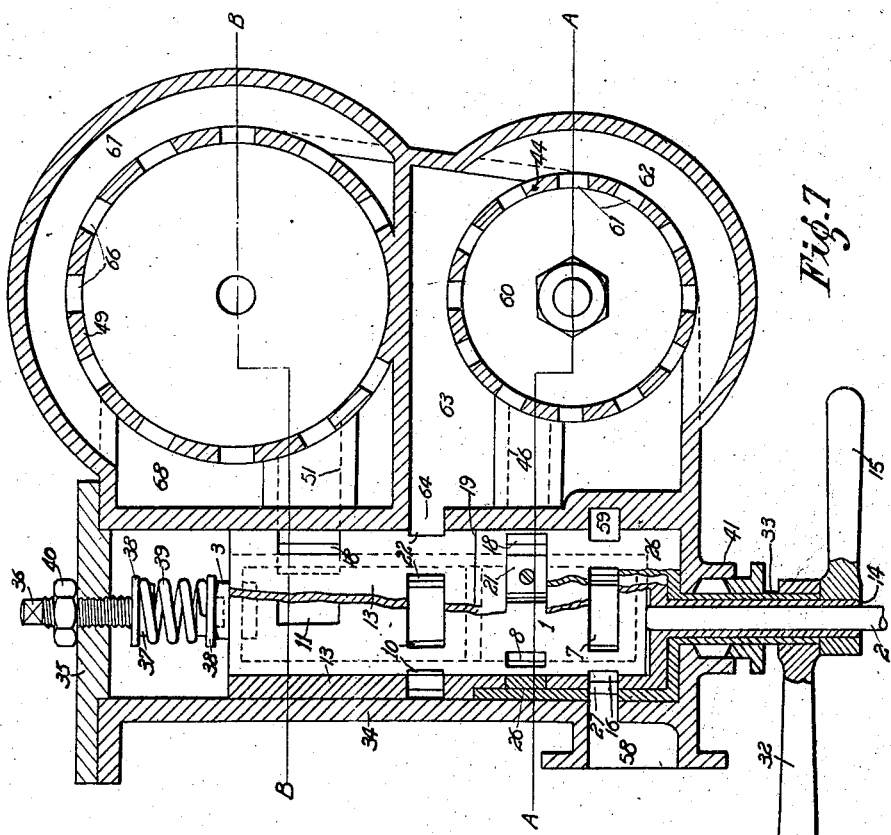
Figure 7 is a horizontal cross-sectional view, part of the reversing sleeve and part of the cut-off sleeve being removed and one of the pistons being omitted for convenience of illustration.

In operation, steam is admitted by means of a regulating valve inserted in the supply pipe through an inlet pipe 58, cast integrally with the valve casing 34, into the annular chamber 59 surrounding said valve casing and in communication with the interior thereof. The steam flows from said chamber 59 through the inlet ports 27, 16 and 7 of the cut-off sleeve 26, reversing sleeve 13 and valve 1, respectively, into the high pressure chamber 5. Upon either of the outlet ports 8 or 9 being opened by the rotary motion of the valve, the steam within said chamber 5 passes either through the openings 17, 29, port 43 and passage 46, or through openings 18, 28, port 42 and passage 45 into the high pressure cylinder 44—see Figures 7 and 8. Steam admitted to the cylinder 44 drives the piston 60 in a direction depending upon that end of said cylinder which the steam enters.

The piston when nearing the end of its stroke uncovers a series of exhaust ports 61 formed in and around said cylinder 44, through which ports the now expanded steam passes into an exhaust manifold 62 and thence to a receiving chamber 63.

The steam travels from said chamber 63 through ports 64 that are formed in and around the valve casing 34, and through the inlet openings 22 and 10 of the reversing sleeve 13 and valve 1, respectively, into the low pressure chamber 6 of said valve. The steam then passes either through ports 11, 23 or 24, 47 or through ports 12, 25 and 48 into either of the passages 50—51 communicating with the low pressure cylinder 49.

At a time slightly before the termination of the stroke of the piston 65 of said cylinder the steam exhausts through ports 66 formed in and around the wall of said low pressure cylinder 49 into an exhaust manifold 67 and chamber 68, and thence either into the atmosphere or to a condenser.

When the engine is running normally, the blocks 20 and 21 of the reversing sleeve 13 are in the position shown in Figure 8, and the steam is alternately admitted to the passages 45 and 46 in regular sequences. To reverse the engine, the lever 15 is moved to the position shown in Figure 9, thus partially rotating the reversing sleeve and moving the blocks 20 and 21 to the opposite ends of the ports 28 and 29 respectively. This action causes the steam for the next stroke to be admitted to the cylinder 44 through either the port 17 or the port 18 (according to the position of the valve) before the piston 60 has completed its previous stroke, thus altering the sequence of the steam admissions and reversing the direction of the engine in the usual manner.

To regulate the cut-off of steam to the engine, the handle 32 is actuated, causing the cut-off sleeve 26 to be moved to required direction. This causes the position of the blocks 30 and 31 to be changed to increase or decrease the size of the ports 17 and 18, thus varying the moment at which the admission of steam to the engine is cut off.

The engine can only be reversed at the mid-stroke of the piston, when the openings 8 and 9 are on a line parallel to the axis of the cylinder. Should the reversing handle 15 be actuated while the piston is in a position other than mid-stroke, reversing of the engine will not take place until the piston first reaches mid-stroke, when the steam will then be admitted to the opposite side of the piston.

In non-reversing engines, the reversing sleeve 13 is of course dispensed with, and the cut-off sleeve 26 is constructed so as to encircle the high pressure chamber 5 of the rotary valve 1, and with the valve casing forms an effective seating and bearing for said valve.

What I claim and desire to secure by Letters Patent is:—

1. Valve gearing for steam and other fluid-pressure engines, comprising a single continuous hollow valve rotatable about its longitudinal axis and having its interior divided into a plurality of compartments, said valve being provided at one end with a spindle; a reversing sleeve rotatably fitting around said valve and having a hollow spindle which fits around the valve spindle; a cut-off sleeve rotatably fitting around a portion only of the reversing sleeve and having a hollow spindle which fits around the spindle on said reversing sleeve; a casing wherein said valve and sleeves are arranged, all three spindles extending outward through the same end of the casing; and individual operating means connected with the respective spindles for operating any one independently of the others.

2. Valve gearing for steam and other fluid-pressure engines, comprising a hollow tapered valve rotatable about its longitudinal axis and having its opposite ends closed and its interior divided into a plurality of compartments, said valve being provided at one end with a spindle; an internally-tapered reversing sleeve rotatably and conformably fitting around said valve and open at one end to expose the adjacent end of the valve, said sleeve having at its other end a hollow spindle which fits around the valve spindle and also having an external circumferential shoulder intermediate its ends; a cut-off sleeve rotatably fitting around a portion only of the reversing sleeve and abutting at one end against said shoulder, the other end of the cut-off sleeve being provided with a hollow spindle which fits around the spindle on the reversing sleeve; a casing wherein said valve and sleeves are arranged, and through one end of which all three spindles project; spring means interposed between the exposed end of the valve and the adjacent end wall of the casing to force said valve inwardly of said reversing sleeve so as to maintain steam-tight contact between them; and individual operating means connected with the respective spindles for operating any one independently of the others.

In testimony whereof I affix my signature.

WILLIAM MONTAGU COWARD.